United States Patent [19]
Dailey et al.

[11] Patent Number: 5,646,611
[45] Date of Patent: Jul. 8, 1997

[54] SYSTEM AND METHOD FOR INDIRECTLY DETERMINING INCLINATION AT THE BIT

[75] Inventors: Patrick E. Dailey, Lomita, Calif.; Charles Dwain Barron, Kingwood, Tex.

[73] Assignee: Halliburton Company, Dallas, Tex.

[21] Appl. No.: 393,842

[22] Filed: Feb. 24, 1995

[51] Int. Cl.$^6$ .................................................. G01V 3/00
[52] U.S. Cl. ........................ 340/853.6; 175/45; 33/304; 33/313
[58] Field of Search ..................... 340/853.6; 175/45; 33/304, 313

[56] References Cited

U.S. PATENT DOCUMENTS

| | | | |
|---|---|---|---|
| 4,909,336 | 3/1990 | Brown et al. | 175/45 |
| 4,956,921 | 9/1990 | Coles | 33/304 |
| 5,112,126 | 5/1992 | Graebner | 356/152 |
| 5,155,916 | 10/1992 | Engebretson | 33/302 |
| 5,160,925 | 11/1992 | Dailey et al. | 340/853.3 |
| 5,230,386 | 7/1993 | Wu et al. | 175/45 |
| 5,358,059 | 10/1994 | Ho | 175/45 |

OTHER PUBLICATIONS

Meyer, W.H., et al, *Brief: Geosteering With Near-Bit Formation Evaluation Sensors*; JPT, Feb. 1995.

*Primary Examiner*—J. Woodrow Eldred
*Attorney, Agent, or Firm*—Conley, Rose & Tayon, P.C.

[57] ABSTRACT

The present invention discloses an MWD system which permits an indirect measurement of the wellbore inclination angle at the drill bit, in situations where it is difficult or expensive to measure that angle directly. The system includes a first inclinometer included as part of a conventional directional sensor, which is located in the bottomhole assembly a relatively large distance above the bit. The first inclinometer provides a measure of the inclination angle $\alpha$ at point A. The system also includes a second inclinometer, which is provided closer to the drill bit to provide a measure of the inclination angle $\beta$ at point B. The inclination angles $\alpha$ and $\beta$ are used, together with bottomhole assembly configuration information, and other information relating to drilling tendencies, to determine with a reasonable degree of accuracy the inclination angle $\theta$ of the wellbore at the bit.

46 Claims, 4 Drawing Sheets

SYSTEM AND METHOD FOR INDIRECTLY DETERMINING INCLINATION AT THE BIT

BACKGROUND OF THE INVENTION

The present invention relates generally to a system for determining the inclination of a bottom-hole assembly as part of a measurement while drilling ("MWD") system or a logging while drilling ("LWD") system. More particularly, the present invention relates to a system for determining the inclination of the hole at the drill bit to permit more precise control of the direction in which the bottom-hole assembly is drilled. Still more particularly, the present invention relates to an MWD system that indirectly determines the inclination of the hole at the drill bit by using measurements from two separate inclinometer sensors positioned at discrete locations in the bottom-hole assembly.

Modern petroleum drilling and production operations demand a great quantity of information relating to parameters and conditions downhole. Such information typically includes the location and orientation of the wellbore and drilling assembly, earth formation properties, and drilling environmental parameters downhole. Directional information relating to surveying the location of the wellbore, and controlling or "steering" the drilling assembly, will be discussed later.

The collection of information relating to formation properties and conditions downhole, commonly referred to as "logging," can be performed by several methods. Oil well logging has been known in the industry for many years as a technique for providing information to a driller regarding the particular earth formation being drilled. In conventional oil well wireline logging, a probe or "sonde" housing formation sensors is lowered into the borehole after some or all of the well has been drilled, and is used to determine certain characteristics of the formations traversed by the borehole. The sonde is supported by a conductive wireline, which attaches to the sonde at the upper end. Power is transmitted to the sensors and instrumentation in the sonde through the conductive wireline. Similarly, the instrumentation in the sonde communicates information to the surface by electrical signals transmitted through the wireline.

More recently, those in the industry have placed an increased emphasis on the collection of data during the drilling process itself. By collecting and processing data during the drilling process, without the necessity of removing or tripping the drilling assembly to insert a wireline logging tool, the driller can make accurate modifications or corrections on-the-fly, as necessary, to optimize performance. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

The most common type of MWD sensor is a directional or directional orientation (synonymous terms) sensor. Directional MWD sensors typically comprise a three axis accelerometer and a three axis magnetometer, housed together in the same directional orientation sensor. See "State of the Art in MWD," International MWD Society (January 1993). Normally, drill string tubing is made of steel, which is a magnetic material. According to normal practice, and to prevent interference with the magnetometer readings, the sub housing the directional sensors typically comprises a length of tubing made of a non-magnetic material. Normally, the sub containing the directional sensors is positioned a relatively large distance above the drill bit and/or motor. For example, when a motor is used in the bottomhole assembly, the directional sensor typically is located approximately 50 feet or more above the drill bit.

In accordance with known techniques, wellbore directional measurements can be made as follows: a three axis accelerometer measures the earth's gravitational field vector, relative to the tool axis and a point along the circumference of the tool called the tool face scribe line. From this measurement, the inclination of the bottomhole assembly can be determined to provide an indication of the deviation of the wellbore with respect to vertical. The three axis accelerometer also provides a measure of "tool face angle," which is the orientation (rotational about the tool axis) angle between the scribe line and the high side of the wellbore. Additionally, a three axis magnetometer measures the earth's magnetic field vector in a similar manner. From the combined magnetometer and accelerometer data, the azimuth and magnetic tool face angle of the tool may be determined. As one skilled in the art will understand, azimuth is the horizontally projected direction of the wellbore relative to North.

Because the directional sensors typically are mounted a substantial distance above the bit, the inclination measured by the three axis accelerometer in the directional sub may or may not be a fair representation of the inclination at the bit. In certain directional or horizontal wells, the build rate of the well may exceed 10° per 100 feet. Thus, the inclination measured at the directional sensor may not accurately reflect the inclination at the bit. Inclination is an extremely important parameter for the driller to consider when making decisions regarding course changes and corrections, and the like. As a result, there has been a desire in the drilling industry to obtain inclination information nearer the hole bottom (i.e., at the drill bit) in more nearly "real-time." Placing the directional sensor closer to the bottom of the drill string is risky, however, because of the potential problem of magnetic interference to the azimuth sensors caused by components near the bit, such as the downhole motor. Moreover, the use of a downhole motor makes it difficult to recover sensed values from sensors positioned below the motor because of the practical problems related to placement of, and communication with, the sensors. One attempt to obtain more accurate drilling information at or near the bit is found in U.S. Pat. No. 5,160,925, the teachings of which are incorporated by reference herein. In that patent, a short hop electromagnetic link is used to permit data sensed below the motor to be transmitted around the motor real-time. While this invention provides a viable solution to the problem, such a system is both complicated and expensive. It would therefore be desirable if an alternative system could be developed to provide information reflecting inclination at the bit which is less expensive and simpler to obtain. Although the advantages of such a system are apparent, to date no such system has been developed except for the solution obtained in U.S. Pat. No. 5,160,925.

SUMMARY OF THE INVENTION

The present invention solves the shortcomings and deficiencies of the prior art by providing a system for indirectly determining inclination at the bottom of a wellbore. The system includes a standard directional sensor located in its normal position in the wellbore. In addition, a second inclinometer is positioned in the bottom-hole assembly as close to the drill bit as possible. In situations where a motor is used, the second inclinometer is positioned just above the motor.

The second inclinometer provides a second reference point (B) of inclination at a position closer to the bit than the location (A) of the standard inclination measurement. The present invention uses the first and second inclination measurements, together with information regarding the configuration of the bottomhole assembly (BHA), and may also include the use of drilling tendencies to extrapolate the inclination of the wellbore at the drill bit. The term "configuration," when used herein in reference to the bottomhole assembly, includes but is not limited to, the geometry and material properties of the BHA, and also includes stabilization type(s) (gauge, shape, etc.) and point(s) (or position), and bit type and characteristics as well. The first and second inclination measurements provide two points of reference which, taken together with information regarding the configuration of the bottomhole assembly between the inclinometers (segment C) and between the drill bit and second inclinometer (segment D), and other information relating to drilling tendencies, can provide relatively accurate information regarding inclination at the bit, using an appropriate BHA model. The information relating to the configuration of the BHA typically is entered into the surface processor and can be stored in memory for retrieval later. Other parameters also can be used in the BHA model to increase the accuracy with which the wellbore inclination angle at the bit is determined.

The MWD system includes a downhole processor or controller for controlling the operation of the MWD sensors, including the second inclinometer. The downhole processor obtains desired information from the sensors, encodes that information, and transmits that information to the surface processor via a mud pulse signal.

BRIEF DESCRIPTION OF THE DRAWINGS

For a more detailed description of the preferred embodiment of the present invention, reference will now be made to the accompanying drawings, wherein.

During the course of the following description, the terms "upstream" and "downstream" are used to denote the relative position of certain components with respect to the direction of flow of the drilling mud. Thus, where a term is described as upstream from another, it is intended to mean that drilling mud flows first through the first component before flowing through the second component. Similarly, the terms such as "above," "upper" and "below" are used to identify the relative position of components in the bottom hole assembly, with respect to the distance to the surface of the well, measured along the borehole path.

In addition, in this application the phrase "inclination angle of the wellbore at the bit" or similar phrases which relate to the inclination angle at the bottom of the wellbore, are used herein to refer to the inclination angle of the wellbore at a point located either in the definable vicinity of the borehole bottom, or in the projected path of the wellbore (which has not yet been drilled). These phrases do not limit the ultimately desired inclination angle to the wellbore inclination angle at the bottom of the wellbore (i.e., the bit location during drilling).

DETAILED DESCRIPTION OF THE PREFERRED EMBODIMENT

Figure 1:
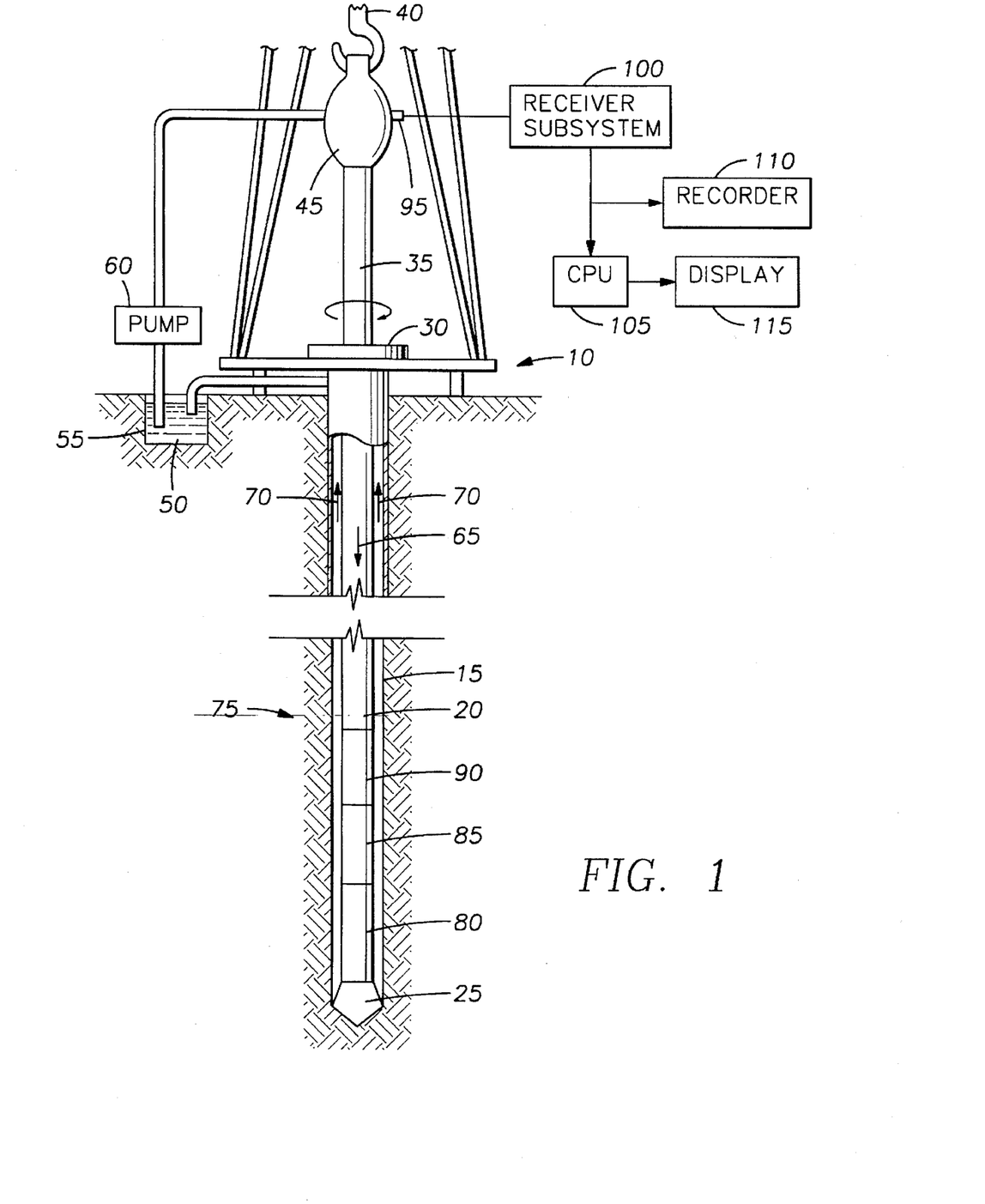
FIG. 1 is a general illustration of a drilling installation implementing the system of the present invention.

Referring to FIG. 1, a typical drilling installation is illustrated which includes a drilling rig 10, constructed at the surface 12 of the well, supporting a drill string 14. The drill string 14 penetrates through a rotary table 16 and into a borehole 18 that is being drilled through earth formations 20. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 typically includes drill collars 28, directional MWD sensors located in a non-magnetic section 60, other MWD sensors positioned in a separate collar section 55, a downhole motor 40, a drill bit 32 and one or more stabilizer(s) (not shown) for penetrating through earth formations to create the borehole 18. In operation, the kelly 22, the drill pipe 24 and the BHA 26 are rotated by the rotary table 16. The drill collars 28 (which also may be non-magnetic so as not to interfere with the MWD measurements) are used, in accordance with conventional techniques, to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate the underground formations.

As the drill bit 32 operates, drilling fluid or mud is pumped from a mud pit 34 at the surface through the kelly hose 37, into the drill pipe, to the drill bit 32. After flowing through the drill bit 32, the drilling fluid rises back to the surface through the annular area between the drill pipe 24 and the borehole 18, where it is filtered and returned to the mud pit 34. The drilling fluid is used to lubricate the drill bit 32 and to remove cuttings from the borehole 18. As one skilled in the art will realize, a downhole motor or turbine 40 may be used downhole to rotate the drill bit 32 as an alternative, or in addition to, rotating the drill string from the surface.

Figure 2:
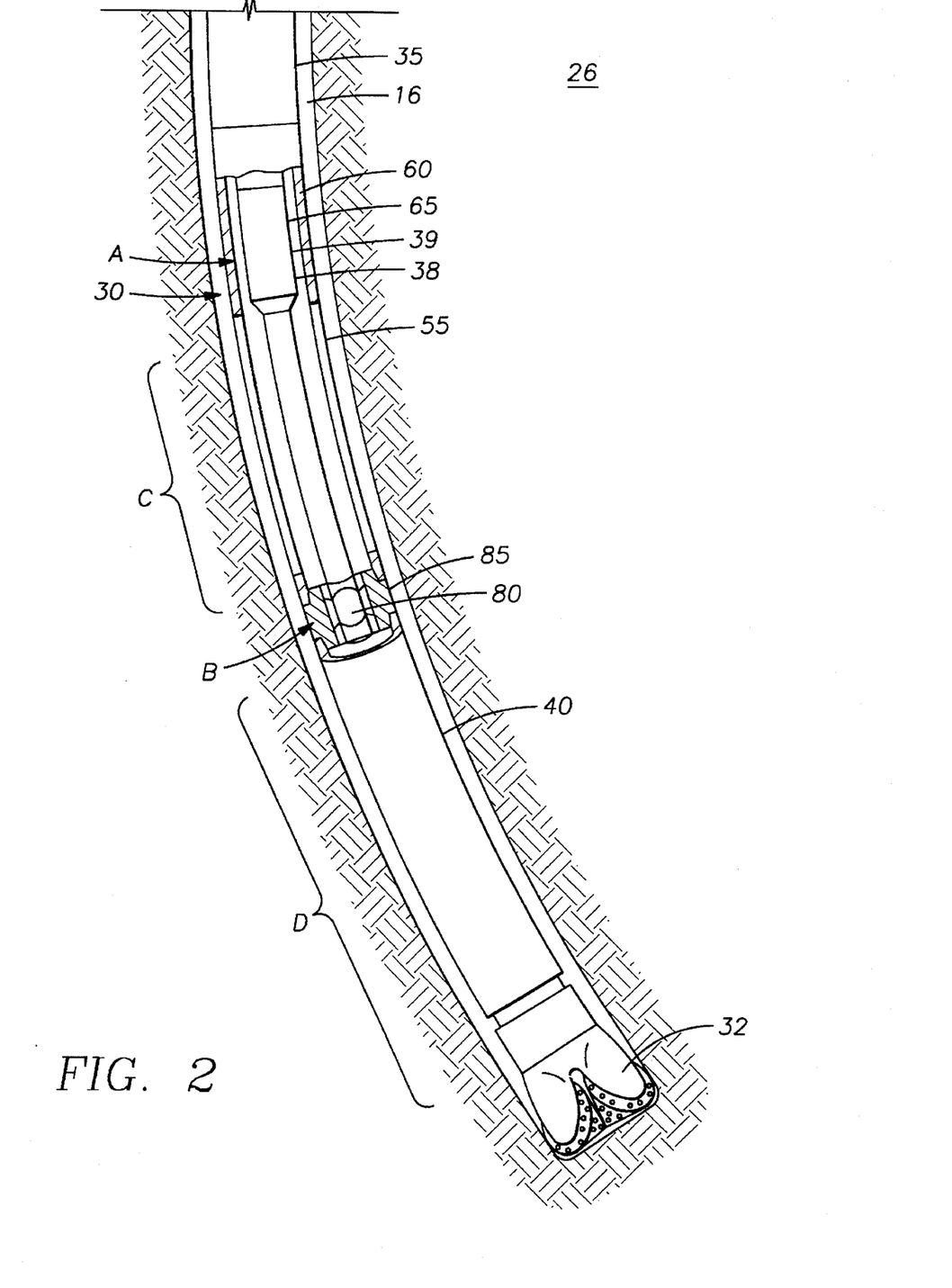
FIG. 2 is a front elevation, partially in section of the bottom hole assembly of FIG. 1, constructed in accordance with the preferred embodiment.

As shown in FIGS. 1 and 2, the BHA 26 typically is defined as all of the downhole components from the top of the drill collars 28, down to and including the drill bit 32, including downhole motor 40. As one skilled in the art will understand, a downhole motor 40 is an optional component which may be omitted from the BHA 26 if desired. In the preferred embodiment, the BHA 26 preferably includes a measurement while drilling system 30 (referred to herein as an "MWD system"), which may be considered part of the drill collar section 28.

Figure 3:
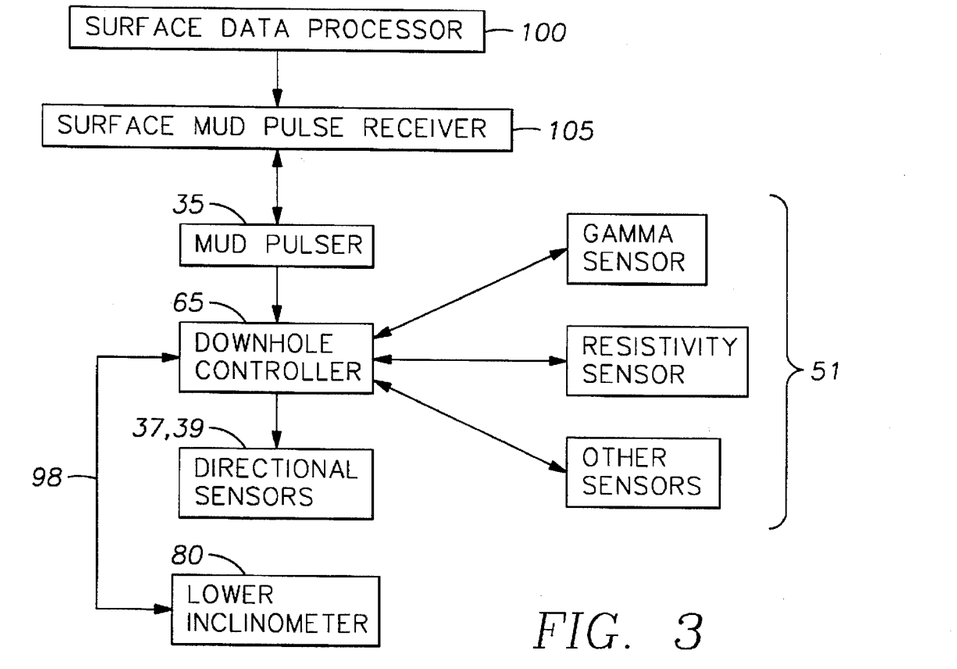
FIG. 3 is a system block diagram generally depicting the process control and information flow of the system of FIG. 1.

The MWD system 30 typically includes directional MWD sensors 38, 39 housed in the non-magnetic sub 60 (or drill collar), and can include formation sensors 51, as well. As shown in FIG. 3, the formation sensors 51 may include gamma, resistivity, and other sensors (i.e., sonic, density and neutron sensors) in accordance with normal industry practice. In addition, drilling mechanics sensors may be provided, such as weight-on-bit (WOB), torque-on-bit (TOB), shock, vibration, etc. See generally "State of the Art in MWD," International MWD Society (Jan.19, 1993). A downhole controller 65 preferably controls the operation of a signalling unit 35 and orchestrates the operation of the MWD sensors and components. As shown in FIG. 2, the controller 65 may be located in sub 60 or elsewhere in the MWD system 30.

Referring to FIGS. 1, 2 and 3, the downhole data signalling unit 35 preferably is provided as part of the MWD system 30 and is used to transmit sensed values to a surface receiver 105 via a mud pulse acoustic signal. In addition, the downhole system may also include the capability of receiving mud pulse signals from the surface to control the operation or activation of certain MWD sensors or other downhole components. The signalling unit 35 in the preferred embodiment comprises a mud pulser unit housed in a non-magnetic sub in accordance with conventional industry practice.

The downhole controller 65 may include appropriate data encoding circuitry, which produces sequentially encoded digital data signals representative of the measurements obtained by the downhole sensors. In addition, the controller 65 processes the data received from the sensors and produces encoded signals indicative of a portion or all of the received signals for transmission to the surface via a mud pulse signal. The controller 65 also may make decisions based upon the processed data.

Referring to FIG. 2, the present invention preferably includes a conventional MWD system 30, which includes at least a directional sensor. In addition to this base MWD system, the present invention adds a second inclinometer 80 that connects electrically and mechanically to the conventional MWD system 30. According to the preferred embodiment, the second inclinometer 80 is positioned in the bottomhole assembly 26 as close as possible to the drill bit 32.

Referring now to FIGS. 1 and 2, in the preferred implementation, the non-magnetic section 60 contains the directional sensors 38, 39. The directional sensors 38, 39 in sub 60 are selected and adapted as required for the particular drilling operation, to measure such downhole parameters as the inclination and azimuth of the BHA at point A. The directional MWD sensors 38, 39 typically comprise a three axis magnetometer and a three axis accelerometer, preferably housed together in the same sub 60. See "State of the Art in MWD," International MWD Society (January 1993), the teachings of which are incorporated herein.

The non-magnetic section 60 containing the directional sensors is positioned a relatively large distance above the drill bit (approximately 50 feet or more when a motor is used), in accordance with normal practice. The three axis accelerometer 39 measures the earth's gravitational vector, relative to the tool axis and a point along the circumference of the tool called the scribe line. From this measurement, the inclination angle α of the bottomhole assembly at point A can be obtained. The three axis accelerometer also provides a measure of "tool face," which is the angle between the scribe line (which may be located on a particular tool), relative to the high side of the wellbore. The three axis magnetometer 38 measures the earth's magnetic field vector relative to the axis of the tool, and to the same tool face scribe line to thereby determine the magnetic tool face. From combined magnetometer and accelerometer readings, the azimuth of the tool at point A may be determined.

Because the directional sensors 38, 39 typically are mounted a substantial distance above the bit 32, the inclination measured by the three axis accelerometer in the directional MWD system 30 represents the inclination at point A. This inclination may or may not be a fair representation of the inclination at the bit 32. In accordance with the principles of the present invention, directional sensor 80 preferably is provided in the bottomhole assembly 26 below the conventional MWD system 30. If a motor 40 is included in the bottomhole assembly 26, the directional sensor preferably is located directly above the motor 40.

Referring to FIGS. 2 and 3, the directional sensor 80 preferably comprises a three axis inclinometer for measuring the inclination angle β of the BHA 26 at point B. Alternatively, a single z axis inclinometer may be used instead of the three axis inclinometer in horizontal drilling applications (where drilling is being performed between approximately 20° and 160° of inclination). The inclination angle β measured by inclinometer 80 at point B is used in conjunction with the inclination angle α reading from the three axis inclinometer at point A, along with other BHA and drilling tendency information, to indirectly determine the inclination angle θ of the wellbore at the drill bit 32, through the use of an inclination extrapolation model, as described below.

Figure 4:
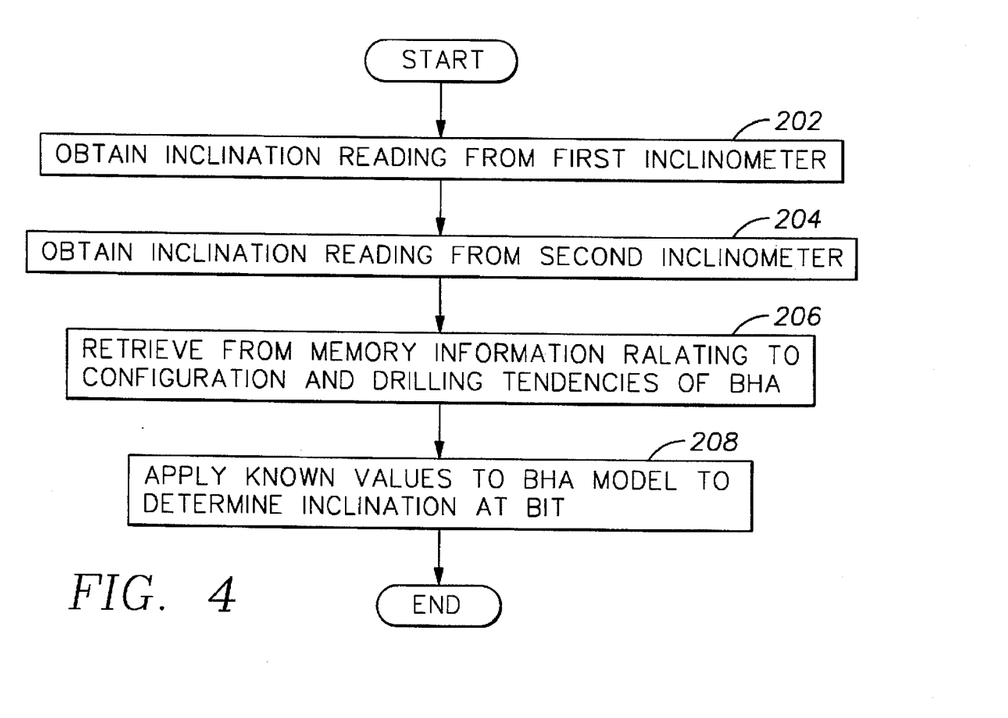
FIG. 4 is a flow chart depicting the general method of indirectly determining inclination of hole at the drill bit.
Figure 5:
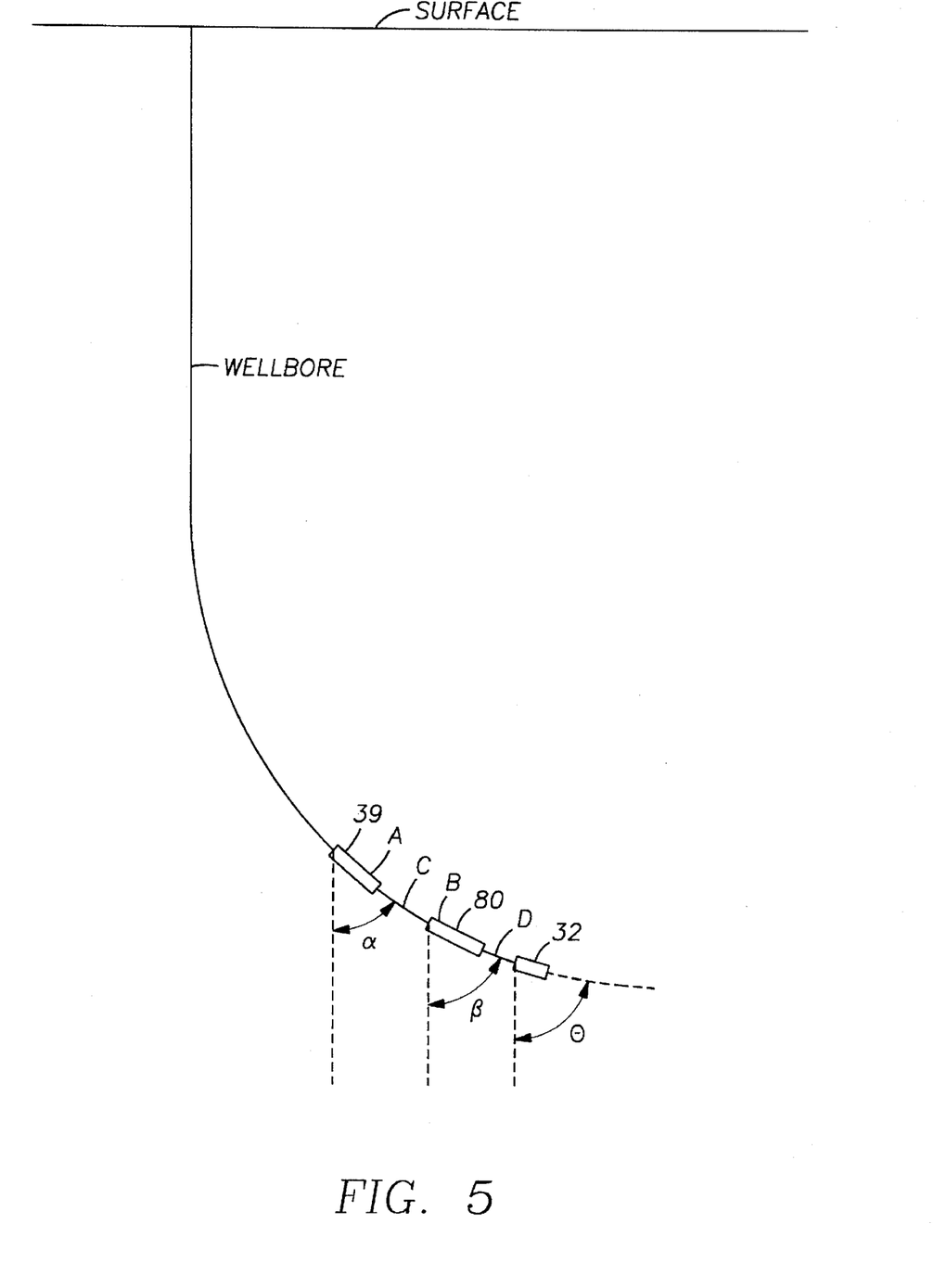
FIG. 5 is a drawing of a drilling path which illustrates the known quantities used in the BHA model to determine the inclination angle of the wellbore at the drill bit.

Referring now to FIGS. 4 and 5, the operation of the present invention will now be described in general terms. In step 202, the downhole controller 65 obtains inclination information from the first inclinometer sensor 39 reflecting the inclination angle α at point A. In step 204, the controller 65 obtains an inclination reading from inclinometer 80 reflecting the inclination angle β at point B. After all necessary and desired sensory information is obtained by the controller 65, the controller preferably sends a mud pulse signal to the surface processor 100 reflecting these values to enable the surface processor to perform steps 206 and 208. Alternatively, downhole controller 65 may perform these steps if the necessary configuration information is available or provided to controller 65.

In step 206, surface processor retrieves information relating to the configuration of BHA 26 at segments C and D. Segment C represents the configuration of BHA 76 between the two inclinometers 39, 80. Segment D represents the configuration of BHA 26 between inclinometer 80 and the bit. After these values are retrieved from memory, or received from an external device or from an operator, the surface processor 100 applies the known data to an appropriate BHA model, which preferably is similar to a conventional program used by most drillers to predict the drilling path of a BHA. See e.g. J. S. Williamson, et al. "Predicting Bottomhole Assembly Performance," IADC/SPE 14764, presented in Dallas, Tex. on Feb. 10–12, 1986, the teaching of which are incorporated by reference. The known values include inclination angle α at point A, inclination angle β at point B, the configuration (including orientation and length) of segments C and D, and other data indicative of drilling tendencies, including weight-on-bit, size and location of stabilizers, and the location and degree of bend angles of bent subs and bent housings. See U.S. Pat. No. Re. 33,751, the teachings of which are incorporated by reference. From these values, and with the use of an appropriate inclination extrapolation model, the inclination angle θ of the hole at the drill bit can be determined with a reasonable degree of accuracy in step 208.

While a preferred embodiment of the invention has been shown and described, modifications thereof can be made by one skilled in the art without departing from the spirit of the invention.

We claim:

1. A downhole directional measurement system to determine an inclination angle θ of a wellbore, comprising:
   a first inclinometer for measuring an inclination angle α of the wellbore at a first location in said downhole directional measurement system, and producing an output signal indicative thereof;
   a second inclinometer for measuring an inclination angle β of the wellbore at a second location in said downhole directional measurement system, and producing an output signal indicative thereof;
   wherein said system is capable of determining the inclination angle θ of the wellbore at a point in the definable vicinity of the wellbore bottom by extrapolation based upon said inclination angle α and said inclination angle β.

2. A system as in claim 1, wherein said downhole directional measurement system forms part of a measurement-while-drilling system.

3. A system as in claim 1, wherein said system forms part of a wireline system.

4. A system as in claim 1, further comprising a processor located at the wellbore surface coupled to said first inclinometer and said second inclinometer for receiving said signals therefrom, and for determining the inclination angle θ.

5. A system as in claim 1, further comprising a controller positioned downhole, which connects electrically to said first and second inclinometers for determining the inclination angle θ.

6. A system as in claim 5, wherein said controller selectively activates said inclinometers.

7. A system as in claim 5, further comprising:
   a mud pulser connected to said downhole controller for transmitting a mud pulse signal indicative of the output signals from said first and second inclinometers.

8. A system as in claim 5, wherein said downhole directional measurement system is used in conjunction with a bottomhole drilling assembly, and said controller includes a memory for storing information relating to configuration of the bottomhole drilling assembly.

9. A system as in claim 8, wherein said controller uses said configuration information and said output signals from said first and second inclinometer to determine said inclination angle θ.

10. A system as in claim 9, further comprising a stabilizer and wherein said configuration information includes the location and size of said stabilizer.

11. A system as in claim 9, further comprising a bend in said bottomhole drilling assembly and wherein said configuration information includes the degree and location of the bend.

12. A system as in claim 9, further comprising a sensor for measuring additional directional information, and providing an output signal indicative thereof.

13. A system as in claim 12, wherein said downhole controller connects electrically to said sensor and receives said output signal from said sensor.

14. A system as in claim 5, wherein said controller uses drilling tendency information and said output signals from said first and second inclinometer to determine said inclination angle θ.

15. A system as in claim 14, wherein the controller also uses configuration information to determine said inclination angle θ.

16. A system as in claim 5, wherein said controller uses configuration information and said output signals from said first and second inclinometer to determine said inclination angle θ.

17. A system as in claim 4, further comprising a sensor for measuring additional directional information, and providing an output signal indicative thereof, and wherein said surface processor receives said additional directional information and said output signals from said first and second inclinometers as part of a mud pulse signal and uses these signals in determining said inclination angle θ.

18. A system as in claim 17, further comprising a memory for storing configuration information of the bottomhole assembly.

19. A system as in claim 18, wherein said processor reads said configuration information when determining said inclination angle θ.

20. A system as in claim 19, wherein said processor also receives drilling tendency information and uses the drilling tendency information in determining said inclination angle θ.

21. A system as in claim 20, wherein said drilling tendency information includes weight-on-bit.

22. A system as in claim 1, wherein said system uses configuration information in determining the inclination angle θ.

23. A system as in claim 22, wherein said system also uses drilling tendency information in determining the inclination angle θ.

24. A system as in claim 1, wherein said system uses drilling tendency information in determining the inclination angle θ.

25. A bottomhole assembly, comprising:
   a drill bit;
   a downhole motor connected to said drill bit for selectively rotating said drill bit;
   a directional sensor positioned in said bottomhole assembly above said motor, said directional sensor comprising a collar housing a first inclinometer and a magnetometer;
   a second inclinometer positioned between said directional sensor and said motor.

26. A bottomhole assembly as in claim 25, further comprising a downhole controller electrically connected to said first and second inclinometer and to said magnetometer for controlling the determination of an inclination angle θ.

27. A bottomhole assembly as in claim 26, further comprising a drilling parameter sensor connected to said downhole controller.

28. A bottomhole assembly as in claim 27, wherein said downhole controller connects to a mud pulser for transmitting a signal representative of sensed values from said first and second inclinometer, said magnetometer and said drilling parameter sensor to the surface of the well.

29. A bottomhole assembly as in claim 28, wherein said downhole controller determines the inclination angle θ of the wellbore at a point in the definable vicinity of the bit, based upon sensed values from said first and second inclinometer, said magnetometer and said drilling parameter sensor.

30. A method for determining inclination of a wellbore at a point in a definable vicinity of the wellbore bottom, comprising:
   obtaining an inclination reading from a first inclinometer in a bottomhole assembly;
   obtaining an inclination reading from a second inclinometer in a bottomhole assembly, said second inclinometer being axially displaced from said first inclinometer;
   retrieving information relating to configuration of the bottomhole assembly;

applying said inclination readings and configuration information to a bottomhole assembly model to determine inclination of said wellbore.

31. A method as in claim 30, wherein the inclination reading from the first inclinometer includes a measurement of an inclination angle α at a point A in the bottomhole assembly.

32. A method as in claim 31, wherein the inclination reading from the second inclinometer includes a measurement of an inclination angle β at a point B in the bottomhole assembly.

33. A method as in claim 32, wherein the information relating to the configuration of the bottomhole assembly includes ascertaining the orientation of the first inclinometer and the second inclinometer, and the distance between said first inclinometer and said second inclinometer.

34. A method as in claim 33, wherein the information relating to the configuration of the bottomhole assembly includes ascertaining the orientation of a drill bit, and the distance between the second inclinometer and the drill bit.

35. A method as in claim 34, wherein the step of retrieving information relating to configuration of the bottomhole assembly includes retrieving bottomhole assembly parameters from memory.

36. A method as in claim 35, further comprising the step of obtaining other sensed values indicative of drilling tendencies.

37. A method as in claim 36, further comprising the step of obtaining other sensed values indicative of other directional parameters.

38. A downhole directional measurement system to determine directional data of a wellbore, comprising:

a first directional sensor for measuring a directional data component of the wellbore at a first location in said downhole directional measurement system, and producing an output signal indicative thereof;

a second directional sensor for measuring the directional data component of the wellbore at a second location in said downhole directional measurement system, and producing an output signal indicative thereof, wherein said second location in said downhole directional measurement system is axially displaced from said first location in said downhole directional measurement system; and wherein said downhole directional measurement system is capable of determining the directional data component of the wellbore at a third point in the wellbore by extrapolation based upon the directional data obtained by said first and second directional sensors.

39. A system as in claim 38, wherein said directional data component comprises inclination.

40. A system as in claim 38, wherein said directional data component comprises azimuth.

41. A system as in claim 38, wherein said directional data component comprises tool face angle.

42. A system as in claim 38, wherein said first and second directional sensors measure a plurality of directional data components of the wellbore at the first and second location in said downhole directional measurement system, and said downhole directional measurement system is capable of determining the plurality of directional data components of the wellbore at the third point in the wellbore by extrapolation based upon the directional data obtained by said first and second directional sensors.

43. A system as in claim 38, further comprising a controller which connects electrically to said first and second directional sensors for determining the directional information of the wellbore at said third point in the wellbore.

44. A system as in claim 43, wherein said downhole directional measurement system is used in conjunction with a bottomhole drilling assembly, and said controller includes a memory for storing information relating to configuration of the bottomhole drilling assembly.

45. A system as in claim 43, wherein said third point is in the vicinity of the wellbore bottom.

46. A system as in claim 43, wherein said first and second directional sensors measure inclination.

* * * * *

REEXAMINATION CERTIFICATE (4023rd)

United States Patent [19]
Dailey et al.

[11] B1 5,646,611
[45] Certificate Issued Mar. 21, 2000

[54] SYSTEM AND METHOD FOR INDIRECTLY DETERMINING INCLINATION AT THE BIT

[75] Inventors: Patrick E. Dailey, Lomita, Calif.; Charles Dwain Barron, Kingwood, Tex.

[73] Assignee: Halliburton Energy Services, Inc., Houston, Tex.

Reexamination Request:
No. 90/004,923, Feb. 20, 1998

Reexamination Certificate for:
Patent No.: 5,646,611
Issued: Jul. 8, 1997
Appl. No.: 08/393,842
Filed: Feb. 24, 1995

[51] Int. Cl.[7] .................................................. G01V 3/00
[52] U.S. Cl. .......................... 340/853.6; 175/45; 33/304; 33/313
[58] Field of Search .......................... 340/853.6; 175/45; 33/304, 313

[56] References Cited

U.S. PATENT DOCUMENTS

| | | | |
|---|---|---|---|
| 4,666,300 | 5/1987 | Zollman et al. | 356/141 |
| 4,901,804 | 2/1990 | Thometz et al. | 175/40 |
| 5,103,177 | 4/1992 | Russell et al. | 324/346 |
| 5,320,180 | 6/1994 | Ruley et al. | 175/26 |

FOREIGN PATENT DOCUMENTS 2086055   5/1982   United Kingdom.

*Primary Examiner*—J. Woodrow Eldred

[57] ABSTRACT

The present invention discloses an MWD system which permits an indirect measurement of the wellbore inclination angle at the drill bit, in situations where it is difficult or expensive to measure that angle directly. The system includes a first inclinometer included as part of a conventional directional sensor, which is located in the bottomhole assembly a relatively large distance above the bit. The first inclinometer provides a measure of the inclination angle $\alpha$ at point A. The system also includes a second inclinometer, which is provided closer to the drill bit to provide a measure of the inclination angle $\beta$ at point B. The inclination angles $\alpha$ and $\beta$ are used, together with bottomhole assembly configuration information, and other information relating to drilling tendencies, to determine with a reasonable degree of accuracy the inclination angle $\theta$ of the wellbore at the bit.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–29 and 38–46 is confirmed.

Claim 30 is determined to be patentable as amended.

Claims 31–37, dependent on an amended claim, are determined to be patentable.

30. A method for determining inclination of a wellbore at a point in a definable vicinity of the wellbore bottom, comprising:

obtaining an inclination reading from a first inclinometer in a bottomhole assembly;

obtaining an inclination reading from a second inclinometer in a bottomhole assembly, said second inclinometer being axially displaced from said first inclinometer;

retrieving information relating to configuration of the bottomhole assembly;

applying said inclination readings and configuration information to a bottomhole assembly model to determined *by extrapolation the* inclination of said wellbore.

* * * * *